(12) United States Patent
Gill et al.

(10) Patent No.: US 8,839,574 B1
(45) Date of Patent: Sep. 23, 2014

(54) SOLAR PANEL DEVICE FOR AN ISO CARGO CONTAINER

(71) Applicants: Peter E. Gill, Tamuning, GU (US); Peter E. Gill, III, New York, NY (US)

(72) Inventors: Peter E. Gill, Tamuning, GU (US); Peter E. Gill, III, New York, NY (US)

(*) Notice: Subject to any disclaimer, the term of this patent is extended or adjusted under 35 U.S.C. 154(b) by 0 days.

(21) Appl. No.: 14/088,464

(22) Filed: Nov. 25, 2013

(51) Int. Cl.
*E04H 1/00* (2006.01)
*E04D 13/18* (2014.01)
*H01L 31/042* (2014.01)

(52) U.S. Cl.
CPC .................... *H01L 31/0422* (2013.01)
USPC ............ 52/173.3; 52/79.5; 136/244; 136/245

(58) Field of Classification Search
CPC ....... Y02E 10/50; H01J 31/0422; F24J 2/523; F24J 2/5264; E04H 2001/1283; B60P 1/00
USPC .......................... 52/79.5, 173.3; 136/244, 245
See application file for complete search history.

(56) References Cited

U.S. PATENT DOCUMENTS

| | | | | | |
|---|---|---|---|---|---|
| 4,421,943 | A * | 12/1983 | Withjack | ...................... | 136/246 |
| 5,379,596 | A * | 1/1995 | Grayson | ....................... | 62/3.62 |
| 5,969,501 | A * | 10/1999 | Glidden et al. | .............. | 320/101 |
| 6,016,634 | A * | 1/2000 | Sayer | .......................... | 52/648.1 |
| 6,380,481 | B1 * | 4/2002 | Muller | .......................... | 136/244 |
| 6,563,040 | B2 * | 5/2003 | Hayden et al. | ................ | 136/244 |
| 6,672,018 | B2 * | 1/2004 | Shingleton | ................... | 52/173.3 |
| 6,930,237 | B2 * | 8/2005 | Mattiuzzo | ..................... | 136/251 |
| 7,230,819 | B2 * | 6/2007 | Muchow et al. | .............. | 361/601 |
| 7,492,120 | B2 * | 2/2009 | Benn et al. | ..................... | 320/101 |
| 7,793,467 | B1 * | 9/2010 | Melton et al. | .................. | 52/79.1 |
| 8,492,645 | B1 * | 7/2013 | Strahm | ......................... | 136/244 |
| 8,720,125 | B2 * | 5/2014 | Andretich | ...................... | 52/79.5 |
| 2003/0009954 | A1 * | 1/2003 | Bradley | ........................... | 52/79.1 |
| 2006/0137348 | A1 * | 6/2006 | Pas | ................. | 60/641.1 |
| 2008/0068782 | A1 * | 3/2008 | Muchow et al. | ............. | 361/601 |
| 2009/0133732 | A1 * | 5/2009 | Hsia et al. | ..................... | 136/206 |
| 2010/0024317 | A1 * | 2/2010 | Pope | ............................ | 52/79.5 |
| 2011/0047891 | A1 * | 3/2011 | Andretich | ....................... | 52/79.5 |
| 2011/0049992 | A1 * | 3/2011 | Sant'Anselmo et al. | ....... | 307/64 |
| 2011/0146751 | A1 * | 6/2011 | McGuire et al. | ............. | 136/245 |
| 2012/0321436 | A1 * | 12/2012 | Diniaco | ........................ | 414/812 |
| 2013/0014450 | A1 * | 1/2013 | Esposito | ........................... | 52/11 |
| 2013/0056991 | A1 * | 3/2013 | Petersen et al. | .................. | 290/55 |
| 2013/0175201 | A1 * | 7/2013 | Cajiga et al. | .................... | 208/46 |
| 2013/0228165 | A1 * | 9/2013 | Kimura et al. | ................. | 126/640 |
| 2013/0231808 | A1 * | 9/2013 | Flath et al. | ...................... | 701/22 |
| 2014/0137925 | A1 * | 5/2014 | Boyk | ............................. | 136/246 |

* cited by examiner

*Primary Examiner* — William Gilbert
*Assistant Examiner* — Alp Akbasli
(74) *Attorney, Agent, or Firm* — Donald J. Ersler

(57) ABSTRACT

A pivoting solar panel device for an ISO cargo container preferably includes a base frame, at least two solar panel support frames and a plurality of solar panels. The plurality of solar panels are attached to the at least two solar panel support plates. The at least two solar panel support frames are attached to the base frame. The base frame preferably includes four structural angle members, four web truss members, four corner post toes and a plurality of web truss cross members. The pivoting solar panel support frame preferably includes a support plate, a hinge and a jacking device. A horizontal solar panel support frame preferably includes lengthwise and cross panel truss members and a support plate. An angled solar panel support frame preferably includes angled lengthwise and cross panel truss members and the support plate.

13 Claims, 7 Drawing Sheets

SOLAR PANEL DEVICE FOR AN ISO CARGO CONTAINER

BACKGROUND OF THE INVENTION

1. Field of the Invention

The present invention relates generally to cargo containers and more specifically to a solar panel device for an ISO cargo container, which allows an ISO cargo container to be utilized for the generation of electricity.

2. Discussion of the Prior Art

It appears that the prior art does not disclose a solar panel device that may be removably attached to a side or top of an ISO cargo container.

Accordingly, there is a clearly felt need in the art for a solar panel device for an ISO cargo container, which allows an ISO cargo container to be utilized for the generation of electricity when stored in a facility or yard.

SUMMARY OF THE INVENTION

The present invention provides a solar panel device for a cargo container, which allows an ISO cargo container to be utilized for the generation of electricity. A pivoting solar panel device for an ISO cargo container (pivoting solar panel device) preferably includes a base frame, at least two pivoting solar panel support frames and a plurality of solar panels. The base frame preferably includes four structural angle members, four web truss members, four corner post toes and a plurality of web truss cross members. The four structural angle members include two lengthwise structural angle members and two end structural angle members. The four web truss members include two lengthwise web truss members and two end web truss members. The four structural angle members are terminated on each end with two double corner post toes.

Each double corner post toe includes a plurality of grappler pockets. The four web truss members are placed inside the four structural angle members and attached thereto, preferably with welding. A first end of the plurality of web truss cross members are secured to a first lengthwise structural angle member and a second end of the plurality of web truss cross members are secured to a second lengthwise structural angle member. A distance between a width and length of the four grappler pockets must be the same as a distance between a width and length of the grappler pockets of an ISO cargo container.

A plurality of support cross tubes are supported on each end by the first and second lengthwise structural angle members and attached thereto. A plurality of support lengthwise tubes are welded between the plurality of support cross tubes to provide support for a catwalk and the at least two solar panel support frames.

The pivoting solar panel support frame preferably includes a support plate, a hinge and a jacking device. One side of the hinge is attached to the lengthwise structural angle member and the other side of the hinge is attached to one end of the support plate. The other end of the support plate is supported by one the jacking device. At least one solar panel is attached to a top of the support plate. Adjusting a height of the jacking device adjusts the angle of the two solar panels relative to the horizontal plane. A fixed horizontal solar panel device preferably includes the base frame, at least two horizontal solar panel support frames and at least two solar panels. Each horizontal solar panel support frame preferably includes a lengthwise panel truss member, at least two cross panel truss members and a support plate. A bottom of the at least two cross panel truss members are attached to the plurality of support cross tubes. A bottom of the lengthwise panel truss member is attached to the plurality of support lengthwise tubes. The support plate is attached to a top of the at least two cross panel truss members and the lengthwise panel trust member. At least one solar panel is attached to a top of the support plate.

A fixed angled solar panel device preferably includes the base frame, at least two angled solar panel support frames and the plurality of solar panels. Each angled solar panel support frame preferably includes a lengthwise panel truss member, at least two angled cross panel truss members and a support plate. A bottom of the at least two angled cross panel truss members are attached to the plurality of support cross tubes. A bottom of the lengthwise panel truss member is attached to the plurality of support lengthwise tubes. The support plate is attached to a top of the lengthwise panel truss member and the at least two angled cross panel truss members. At least one solar panel is attached to the support plate.

Preferably four MacGregor CV-8 double ended twistlocks purchased, from Cargotec are preferably used to secure the solar panel devices to a side or top of the ISO cargo container.

Accordingly, it is an object of the present invention to provide a solar panel device, which allows an ISO cargo container to be utilized for the generation of electricity when stored in a facility or yard.

These and additional objects, advantages, features and benefits of the present invention will become apparent from the following specification.

DETAILED DESCRIPTION OF THE PREFERRED EMBODIMENTS

Figure 3:
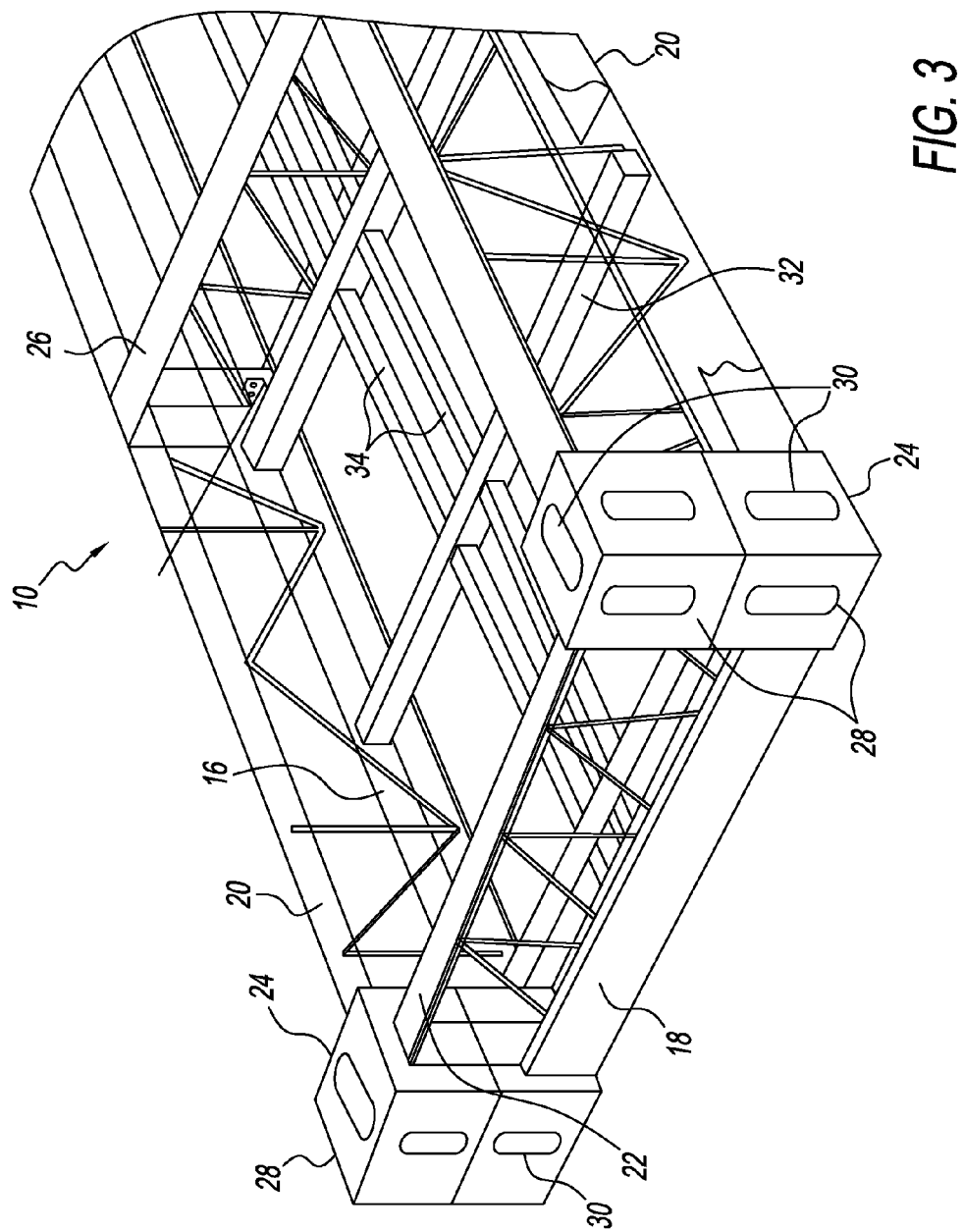
FIG. 3 is a partial perspective view of a base frame of a solar panel device in accordance with the present invention.
Figure 4:
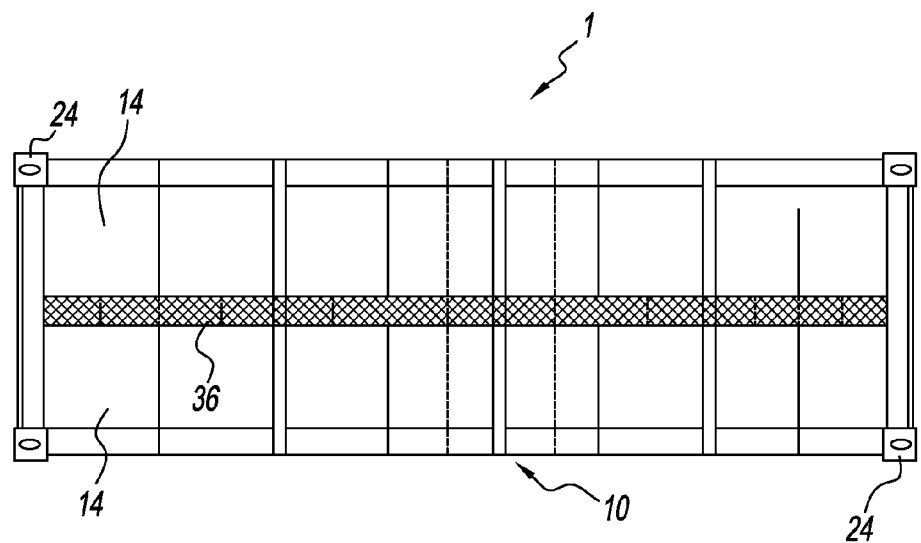
FIG. 4 is a top view of a pivoting solar panel device in accordance with the present invention.
Figure 5:
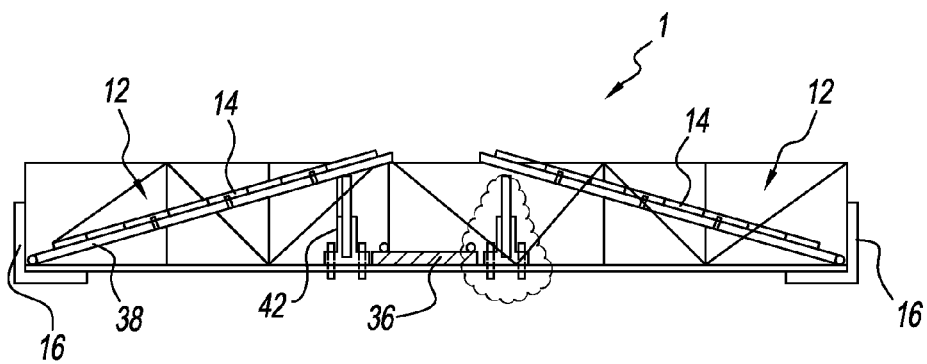
FIG. 5 is an end view of a pivoting solar panel device in accordance with the present invention.
Figure 6:
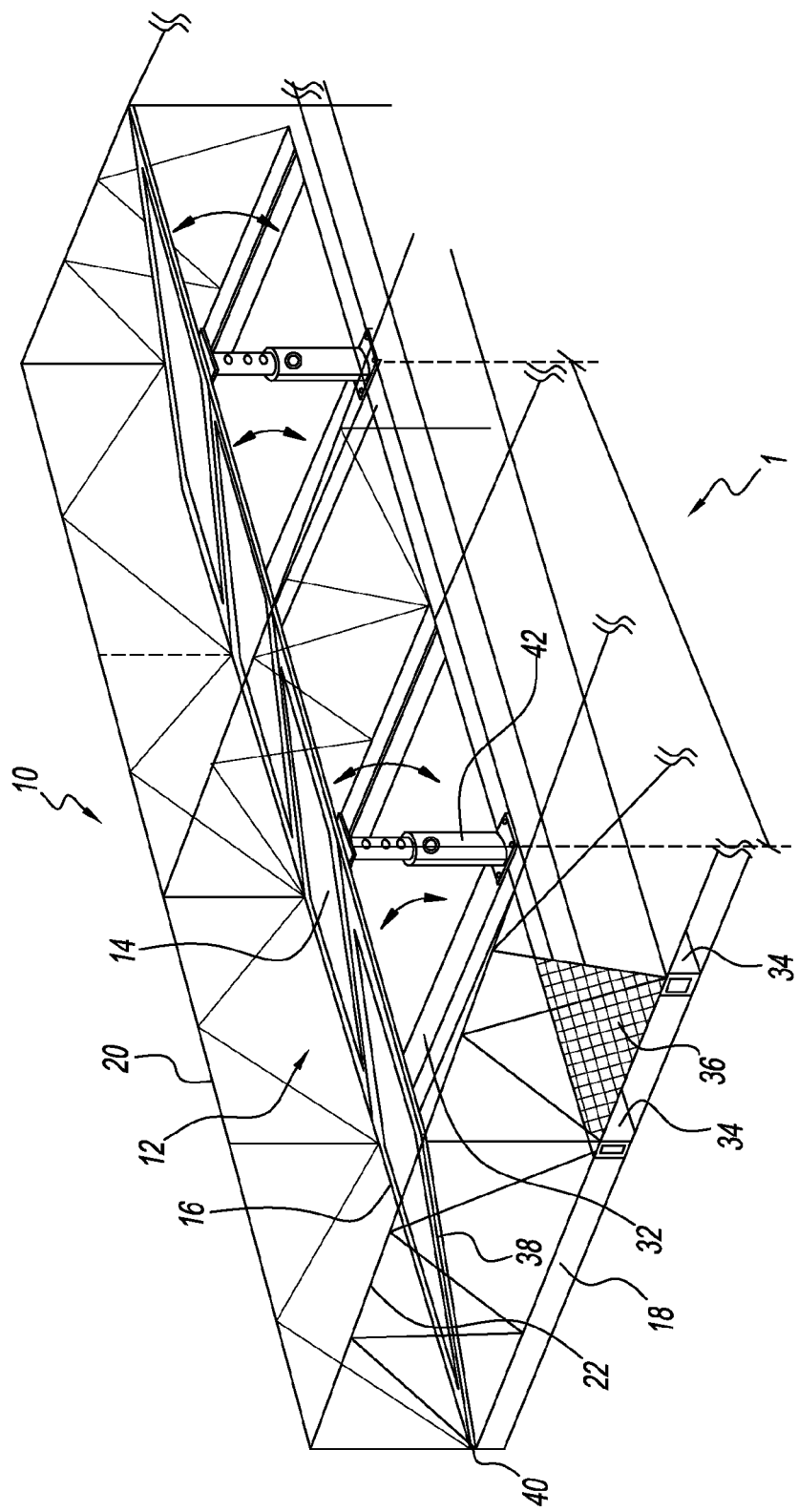
FIG. 6 is a partial perspective view of end view a pivoting solar panel device in accordance with the present invention.

With reference now to the drawings, and particularly to FIG. 5, there is shown an end view of a pivoting solar panel device 1. With reference to FIGS. 3-4 and 6, the pivoting solar panel device 1 preferably includes a base frame 10, at least two solar panel support frames 12 and a plurality of solar panels 14. The base frame 10 preferably includes four structural angle members 16, 18, four web truss members 20, 22, four corner post toes 24 and a plurality of web truss cross members 26. The four structural angle members include two lengthwise structural angle members 16 and two end structural angle members 18. The four web truss members include two lengthwise web truss members 20 and two end web truss members 22. The four structural angle members 16, 18 are terminated on each end with two corner post toes 24.

Figure 1:
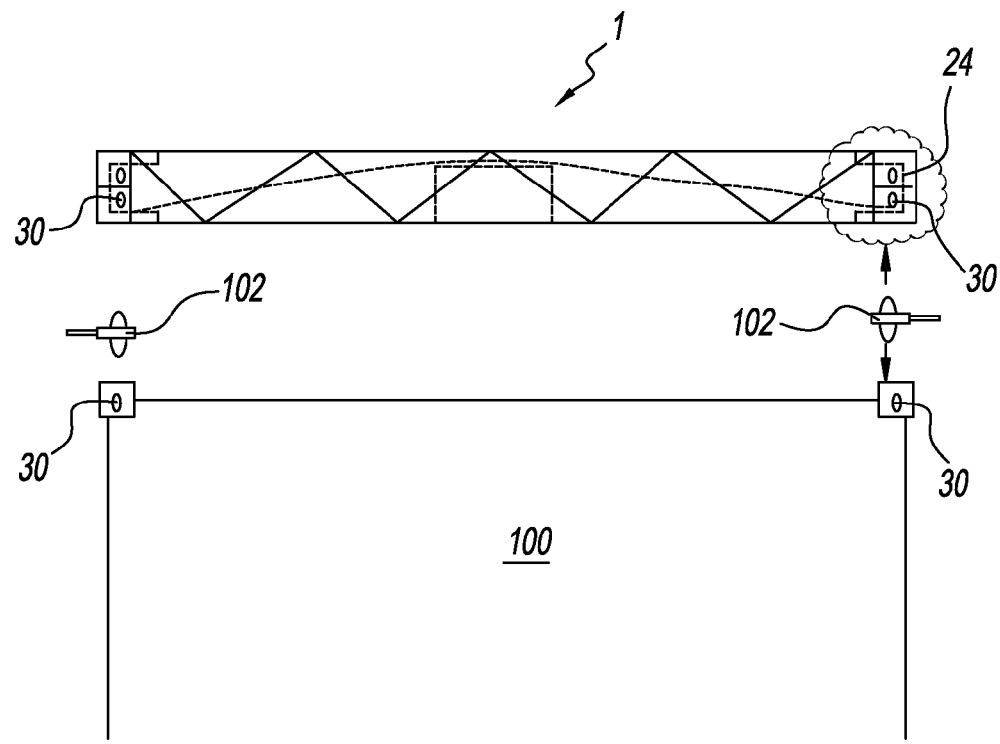
FIG. 1 is an end view of a solar panel device before attachment to an ISO cargo container in accordance with the present invention.
Figure 2:
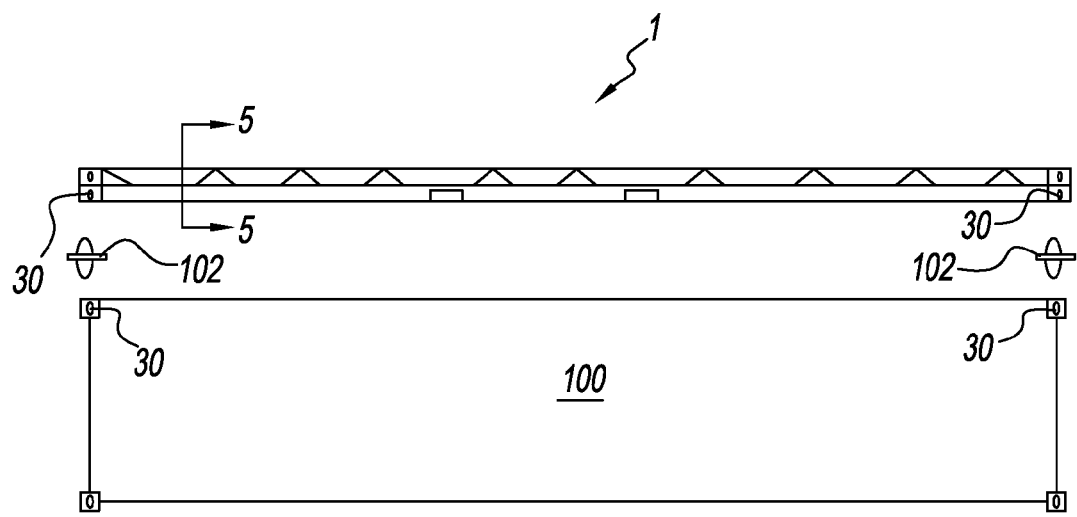
FIG. 2 is an front view of a solar panel device before attachment to an ISO cargo container in accordance with the present invention.

Each corner post toe 24 includes two corner posts 28. Each corner post 28 includes a plurality of grappler pockets 30. The four web truss members 20, 22 are placed inside the four structural angle members 16, 18 and attached thereto, preferably with welding. A first end of the plurality of web truss cross members 26 are secured to a first lengthwise structural angle member 20 and a second end of the plurality of web truss cross members 26 are secured to a second lengthwise structural angle member 20. With reference to FIGS. 1-2, a distance between a width and length of the four grappler pockets 30 on the base frame 10 must be the same as a distance between a width and length of the grappler pockets of an ISO cargo container 100.

A plurality of support cross tubes 32 are supported on each end by the first and second lengthwise structural angle members 20 and attached thereto. A plurality of support lengthwise tubes 34 are welded between the plurality of support cross tubes 32 to provide support for a catwalk 36 and the at least two solar panel support frames 12.

With reference to FIG. 6, the pivoting solar panel support frame 12 preferably includes a support plate 38, a hinge 40 and a jacking device 42. One side of the hinge 40 is attached to the lengthwise structural angle member 16 and the other side of the hinge 40 is attached to one end of the support plate 38. The other end of the support plate is supported by the jacking device 42. Two solar panels 14 are attached to a top of the support plate 38. Adjusting a height of the jacking device 42 adjusts an angle of the two solar panels 14 relative to the horizontal plane.

Figure 7:
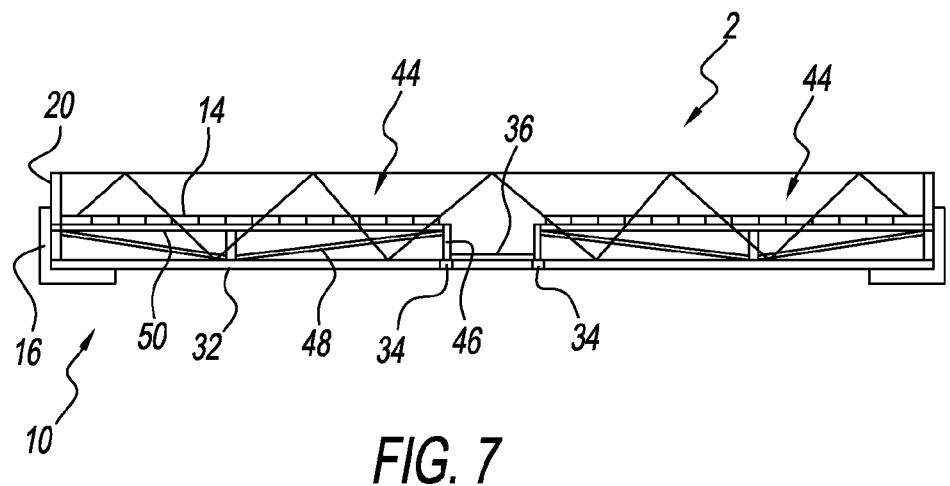
FIG. 7 is an end view of a horizontal solar panel device in accordance with the present invention.

With reference to FIG. 7, a horizontal solar panel device 2 preferably includes the base frame 10, at least two horizontal solar panel support frames 44 and the plurality of solar panels 14. Each horizontal solar panel support frame 44 preferably includes a lengthwise panel truss member 46, at least two cross panel truss members 48 and a support plate 50. A bottom of the at least two cross panel truss members 48 are attached to the plurality of support cross tubes 32. A bottom of the lengthwise panel truss member 46 is attached to the plurality of support lengthwise tubes 34. The support plate 50 is attached to a top of the at least two cross panel truss members 48 and the lengthwise panel trust member 46. Two solar panels 14 are attached to a top of the support plate 50.

Figure 8:
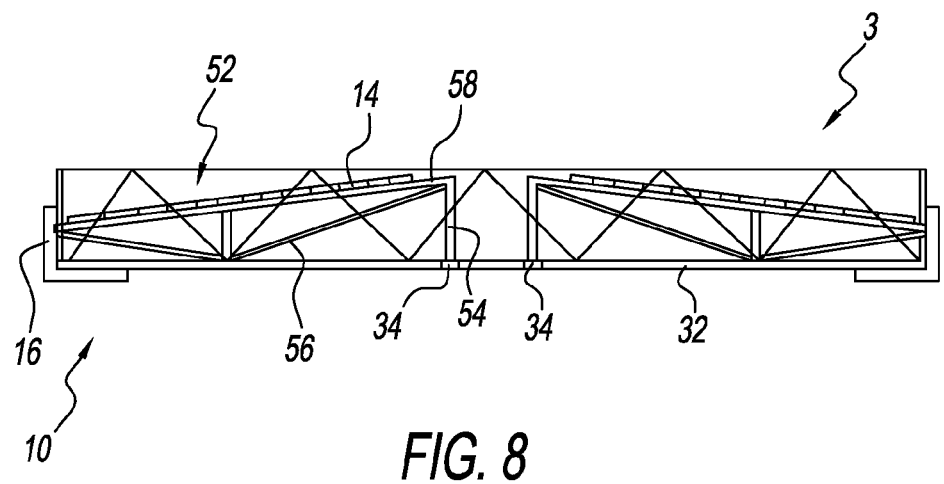
FIG. 8 is an end view of an angle solar panel device in accordance with the present invention.
Figure 9:
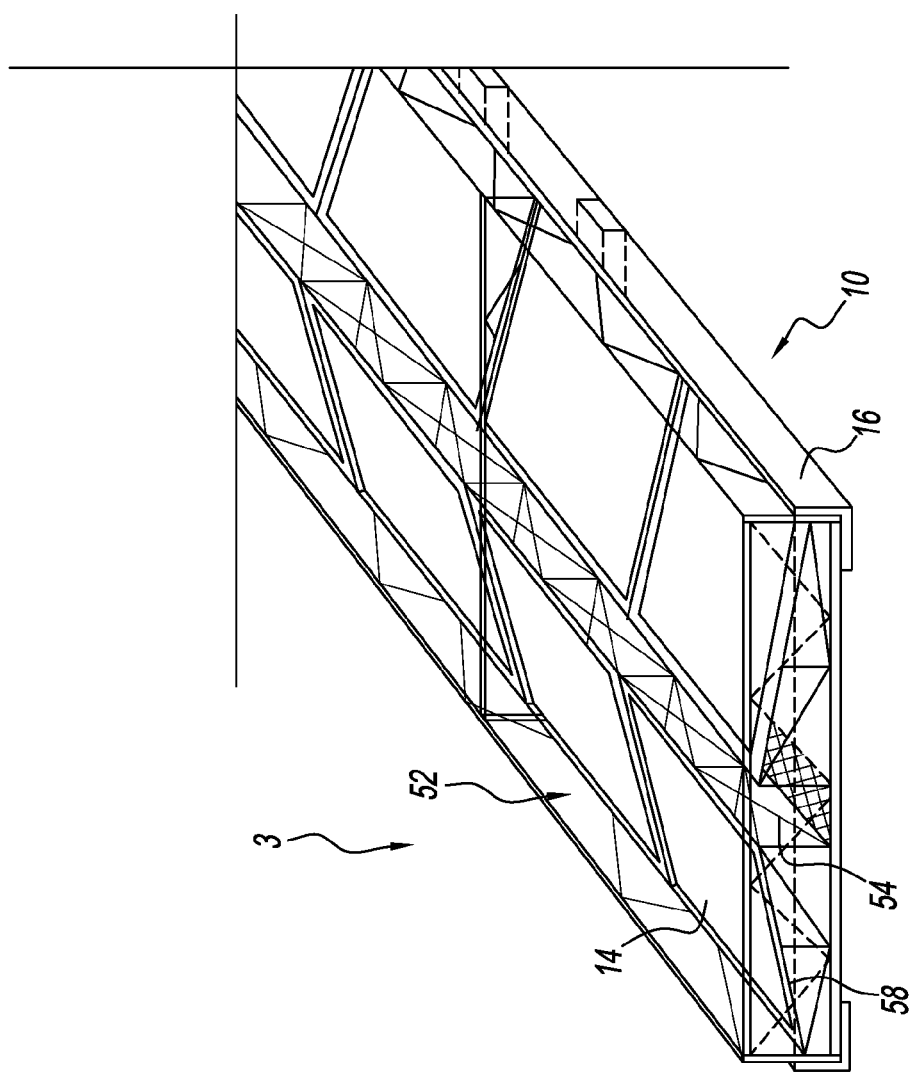
FIG. 9 is a partial perspective view of an angled solar panel device in accordance with the present invention.

With reference to FIGS. 8-9, a fixed angled solar panel device 3 preferably includes the base frame 10, at least two angled solar panel support frames 52 and the plurality of solar panels 14. Each angled solar panel support frame 52 preferably includes a lengthwise panel truss member 54, at least two angled cross panel truss members 56 and a support plate 58. A bottom of the at least two angled cross panel truss members 56 are attached to the plurality of support cross tubes 32. A bottom of the lengthwise panel truss member 54 is attached to the plurality of support lengthwise tubes 34. The support plate 58 is attached to a top of the lengthwise panel truss member 54 and the at least two cross panel truss members 56. Two solar panels 14 are attached to the support plate 58.

Figure 10:
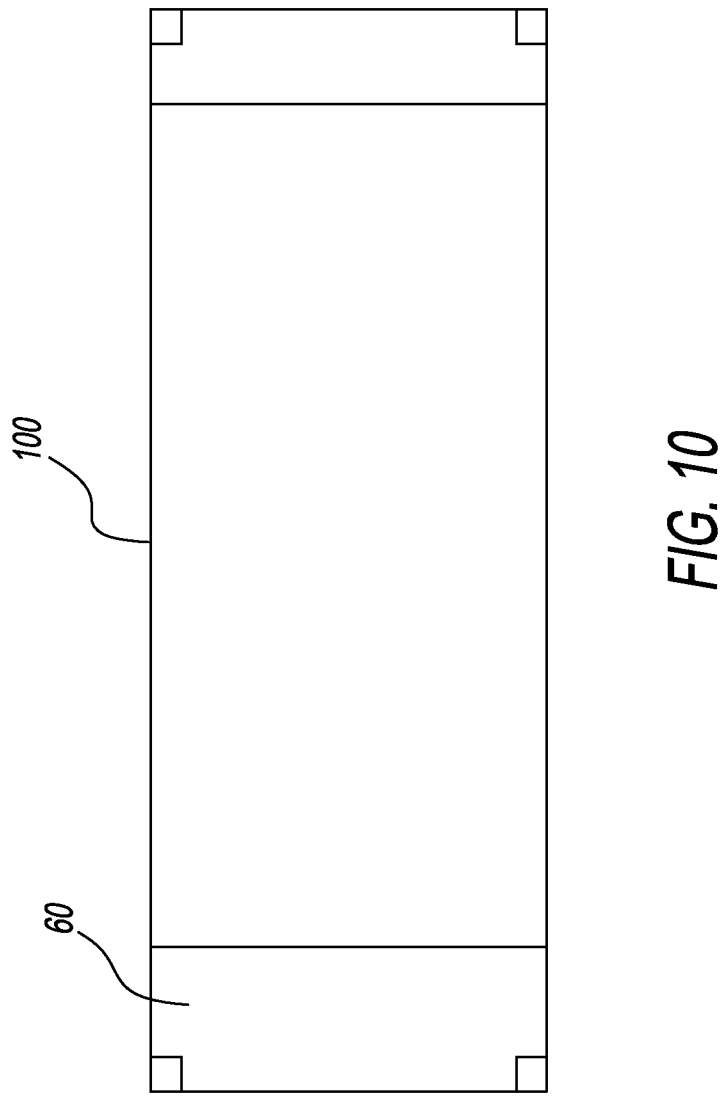
FIG. 10 is a top view of an ISO cargo container defining a section for retaining electrical circuitry associated with a solar panel device in accordance with the present invention.

With reference to FIGS. 1-2, four MacGregor CV-8 double ended twistlocks 102, purchased from Cargotec are preferably used to secure the solar panel devices 1-3 to a side or top of the ISO cargo container 100. With reference to FIG. 10, the ISO cargo container 100 includes an end section 60 for retaining electrical circuitry associated with the solar panel devices 1-3.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A solar panel device for a cargo container comprising:
    a cargo container having at least one container corner post toe located in each corner thereof, each container corner post toe includes a container grappler pocket formed through a top of the at least one container corner post toe;
    a base frame for removable attachment to the cargo container, said base frame includes at least one corner post toe, a grappler pocket is formed through a bottom of said at least one corner post toe, in each corner of said base frame, said base frame includes two lengthwise structural angle members, two end structural angle members, two lengthwise web truss members, two end web truss members and four corner post toes, each end of said four end and lengthwise structural angle members are terminated with said four corner post toes, bottoms of said four lengthwise and end web truss members are retained in said four end and lengthwise structural angle members, wherein said plurality of grappler pockets align with said plurality of container grappler pockets;
    a device for securing each one of said four container corner post toes to said four corner post toes; and
    at least one solar panel support frame is secured to said base frame.

2. The solar panel device for a cargo container of claim 1 wherein:
    said base frame includes two lengthwise structural angle members, two end structural angle members, two lengthwise web truss members, two end web truss members and four corner post toes, each end of said four end and lengthwise structural angle members are terminated with said four corner post toes, bottoms of said four lengthwise and end web truss members are retained in said four end and lengthwise structural angle members.

3. The solar panel device for a cargo container of claim 1 wherein:
    each one of said four corner post toes includes two corner posts, each one of said two corner posts includes said at least one grappler pocket.

4. The solar panel device for a cargo container of claim 1 wherein:
    said at least one solar panel support frame is at least one pivoting solar panel support frame, each one of said at least one pivoting solar panel support frame includes a support plate, at least one hinge and a jacking device.

5. The solar panel device for a cargo container of claim 1 wherein:
    said at least one solar panel support frame is at least one horizontal solar panel support frame, each one of said horizontal solar panel support frame includes a lengthwise panel truss member, at least two cross panel truss members and a support plate.

6. The solar panel device for a cargo container of claim 1, further comprising:
    a catwalk is formed in a middle of said base frame, said catwalk extends at least substantially a length of said base frame, said at least one solar panel support frame is secured to one side of said catwalk, at least one second solar panel support frame to an opposite side of said catwalk.

7. The solar panel device for a cargo container of claim 1 wherein:

the cargo container includes an end section for retaining electrical circuitry associated with said solar panel device.

8. A solar panel device for a cargo container comprising:

a cargo container having at least one container corner post toe located in each corner thereof, each container corner post toe includes a container grappler pocket formed through a top of the at least one container corner post toe;

a base frame for removable attachment to the cargo container, said base frame includes at least one corner post toe in each corner of said base frame, a grappler pocket is formed through a bottom of said at least one corner post toe, said base frame includes two lengthwise structural angle members, two end structural angle members, two lengthwise web truss members, two end web truss members and four corner post toes, each end of said four end and lengthwise structural angle members are terminated with said four corner post toes, bottoms of said four lengthwise and end web truss members are retained in said four end and lengthwise structural angle members, wherein said plurality of grappler pockets align with said plurality of container grappler pockets; and a twistlock having a bottom end and a top end, the bottom end is used to engage the container grappler pocket, the top end is used to engage said grappler pocket; and at least one solar panel support frame is secured to said base frame.

9. The solar panel device for a cargo container of claim 8 wherein:

said base frame includes two lengthwise structural angle members, two end structural angle members, two lengthwise web truss members, two end web truss members and four corner post toes, each end of said four end and lengthwise structural angle members are terminated with said four corner post toes, bottoms of said four lengthwise and end web truss members are retained in said four end and lengthwise structural angle members.

10. The solar panel device for a cargo container of claim 8 wherein:

each one of said four corner post toes includes two corner posts, each one of said two corner posts includes said at least one grappler pocket.

11. The solar panel device for a cargo container of claim 8 wherein:

said at least one solar panel support frame is at least one pivoting solar panel support frame, each one of said at least one pivoting solar panel support frame includes a support plate, at least one hinge and a jacking device.

12. The solar panel device for a cargo container of claim 8 wherein:

said at least one solar panel support frame is at least one horizontal solar panel support frame, each one of said horizontal solar panel support frame includes a lengthwise panel truss member, at least two cross panel truss members and a support plate.

13. The solar panel device for a cargo container of claim 8, further comprising:

a catwalk is formed in a middle of said base frame, said catwalk extends at least substantially a length of said base frame, said at least one solar panel support frame is secured to one side of said catwalk, at least one second solar panel support frame to an opposite side of said catwalk.

\* \* \* \* \*